US011960679B2

(12) United States Patent
Choi et al.

(10) Patent No.: US 11,960,679 B2
(45) Date of Patent: Apr. 16, 2024

(54) DISPLAY DEVICE

(71) Applicant: Samsung Display Co., Ltd., Yongin-si (KR)

(72) Inventors: Boram Choi, Asan-si (KR); Yuna Kim, Seoul (KR); Soojung Lee, Suwon-si (KR); Seungwook Chun, Daegu (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/731,776

(22) Filed: Apr. 28, 2022

(65) Prior Publication Data
US 2023/0045511 A1 Feb. 9, 2023

(30) Foreign Application Priority Data

Aug. 3, 2021 (KR) .................. 10-2021-0101686

(51) Int. Cl.
| | | |
|---|---|---|
| *G06F 3/041* | (2006.01) | |
| *G06F 3/044* | (2006.01) | |
| *G06F 21/32* | (2013.01) | |
| *H10K 59/40* | (2023.01) | |

(52) U.S. Cl.
CPC .......... *G06F 3/0418* (2013.01); *G06F 3/0446* (2019.05); *G06F 21/32* (2013.01); *H10K 59/40* (2023.02)

(58) Field of Classification Search
CPC ..... H10K 59/40; G06F 3/0446; G06F 3/0418; G06F 21/32
USPC ................................................ 345/173, 174
See application file for complete search history.

(56) References Cited

U.S. PATENT DOCUMENTS

| | | | |
|---|---|---|---|
| 8,273,021 B2 | 9/2012 | Jang et al. | |
| 11,171,185 B2 | 11/2021 | Kim et al. | |
| 2012/0026123 A1 | 2/2012 | Grunthaner et al. | |
| 2016/0299611 A1* | 10/2016 | Park | ..................... G06F 3/04164 |
| 2018/0348949 A1* | 12/2018 | Kim | ..................... G06V 40/1306 |
| 2018/0349667 A1* | 12/2018 | Kim | ........................ G09G 5/00 |
| 2018/0373361 A1* | 12/2018 | Her | ........................ G06F 3/0418 |
| 2021/0167135 A1* | 6/2021 | Park | ..................... H10K 59/131 |

FOREIGN PATENT DOCUMENTS

| | | |
|---|---|---|
| KR | 10-0862287 | 10/2008 |
| KR | 10-2012-0012446 | 2/2012 |
| KR | 10-2021-0018702 | 2/2021 |

* cited by examiner

*Primary Examiner* — Jimmy H Nguyen
(74) *Attorney, Agent, or Firm* — KILE PARK REED & HOUTTEMAN PLLC

(57) ABSTRACT

A display device includes a display panel displaying an image, an input sensing layer disposed on the display panel and including a plurality of sensing electrodes, and a sensing controller electrically connected to the input sensing layer and operating in at least one of a first mode and a second mode. A position of a first external input applied to the input sensing layer is sensed in the first mode, biometric information of a second external input applied to the input sensing layer is measured in the second mode. The sensing controller converts a sensing signal sensed from the input sensing layer based on a correction value determined based on parameters of surrounding environment to generate a correction sensing signal, and the sensing controller measures the biometric information from the correction sensing signal in the second mode.

19 Claims, 13 Drawing Sheets

FIG. 10A

| 5 | -3 | 2 | 1 | 5 | 4 | 0 | 3 | 2 | 6 | 3 |
|---|---|---|---|---|---|---|---|---|---|---|
| 3 | 2 | 1 | 0 | 0 | 2 | -3 | 5 | 2 | 1 | 4 |
| 1 | 4 | 0 | -3 | 2 | 3 | 0 | -3 | 6 | 6 | 7 |
| 6 | 1 | 0 | 2 | -2 | 3 | 5 | 4 | 0 | 0 | 2 |
| 0 | 2 | -2 | 0 | 4 | 3 | 2 | 0 | 1 | 5 | 3 |
| 78 | 80 | 75 | 95 | 99 | 84 | 77 | 73 | 81 | 71 | 89 |
| 90 | 237 | 235 | 232 | 260 | 247 | 224 | 225 | 220 | 227 | 230 |
| 242 | 228 | 233 | 262 | 226 | 234 | 245 | 265 | 293 | 284 | 241 |
| 225 | 230 | 248 | 279 | 225 | 221 | 236 | 299 | 225 | 258 | 226 |
| 228 | 222 | 249 | 255 | 274 | 246 | 230 | 255 | 261 | 278 | 292 |
| 247 | 211 | 245 | 263 | 268 | 285 | 274 | 268 | 264 | 221 | 257 |
| 288 | 275 | 283 | 291 | 272 | 228 | 236 | 222 | 288 | 256 | 271 |
| 233 | 291 | 279 | 226 | 246 | 273 | 295 | 244 | 235 | 261 | 263 |
| 10 | 6 | 5 | 6 | 95 | 83 | 81 | 71 | 74 | 79 | 78 |
| 7 | 4 | 2 | 1 | 0 | 6 | 2 | 0 | 5 | 0 | 5 |
| 5 | 8 | 3 | 3 | 7 | 2 | 4 | 1 | 0 | 4 | 3 |
| 6 | 3 | -3 | 4 | -3 | 5 | 6 | 3 | 6 | 4 | 2 |
| 1 | 6 | 2 | 5 | 2 | 7 | 0 | 2 | 1 | 2 | 4 |

SA, MAXV (299), DR1, DR2

| | | | | | | | | | | |
|---|---|---|---|---|---|---|---|---|---|---|
| 5 | -3 | 2 | 1 | 5 | 4 | 0 | 3 | 2 | 6 | 3 |
| 3 | 2 | 1 | 0 | 0 | 2 | -3 | 5 | 2 | 1 | 4 |
| 1 | 4 | 0 | -3 | 2 | 3 | 0 | -3 | 6 | 6 | 7 |
| 6 | 1 | 0 | 2 | -2 | 3 | 5 | 4 | 0 | 0 | 2 |
| 0 | 2 | -2 | 0 | 4 | 3 | 2 | 0 | 1 | 5 | 3 |
| 78 | 80 | 75 | 95 | 99 | 84 | 77 | 73 | 81 | 71 | 89 |
| 90 | 237 | 235 | 232 | 260 | 247 | 224 | 225 | 220 | 227 | 230 |
| 242 | 228 | 233 | 262 | 226 | 234 | 245 | 265 | 293 | 284 | 241 |
| 225 | 230 | 248 | 279 | 225 | 221 | 236 | 299 | 225 | 258 | 226 |
| 228 | 222 | 249 | 255 | 274 | 246 | 230 | 255 | 261 | 278 | 292 |
| 247 | 211 | 245 | 263 | 268 | 285 | 274 | 268 | 264 | 221 | 257 |
| 288 | 275 | 283 | 291 | 272 | 228 | 236 | 222 | 288 | 256 | 271 |
| 233 | 291 | 279 | 77 | 85 | 72 | 73 | 88 | 91 | 86 | 90 |
| 10 | 6 | 5 | 6 | 95 | 83 | 81 | 71 | 74 | 79 | 78 |
| 7 | 4 | 2 | 1 | 0 | 6 | 2 | 0 | 5 | 0 | 5 |
| 5 | 8 | 3 | 3 | 7 | 2 | 4 | 1 | 0 | 4 | 3 |
| 6 | 3 | -3 | 4 | -3 | 5 | 6 | 3 | 6 | 4 | 2 |
| 1 | 6 | 2 | 5 | 2 | 7 | 0 | 2 | 1 | 2 | 4 |

SA, AR1, AR3, AR2, AR3, AR1

DR2 →
DR1 ↓

DISPLAY DEVICE

CROSS-REFERENCE TO RELATED APPLICATION(S)

This application claims priority to and benefits of Korean Patent Application No. 10-2021-0101686 under 35 U.S.C. § 119, filed on Aug. 3, 2021, in the Korean Intellectual Property Office, the contents of which are hereby incorporated by reference in its entirety.

BACKGROUND

1. Technical Field

The disclosure relates to a display device including an input sensing layer.

2. Description of the Related Art

Multimedia electronic devices, such as televisions, mobile phones, tablet computers, navigation units, and game units, include a display device to display images. The display device includes an input sensing layer that provides a touch-based input method may allow users to easily and intuitively input information or commands in addition to the usual input methods, such as a button, a keyboard, a mouse, etc.

The input sensing layer may be included in the display device to sense a position at which a touch event by a part of a user's body occurs.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a display device capable of sensing biometric information of a user using an input sensing layer and preventing the biometric information from being distorted due to environmental influences.

Embodiments of the disclosure provide a display device that may include a display panel displaying an image, an input sensing layer disposed on the display panel and may include a plurality of sensing electrodes, and a sensing controller electrically connected to the input sensing layer, and may operate in at least one of a first mode and a second mode. A position of a first external input applied to the input sensing layer may be sensed in the first mode, biometric information of a second external input applied to the input sensing layer may be measured in the second mode. The sensing controller may convert a sensing signal sensed from the input sensing layer based on a correction value determined based on parameters of surrounding environment to generate a correction sensing signal, and the sensing controller may measure the biometric information from the correction sensing signal in the second mode.

The input sensing layer may include a sensing area in which the first external input or the second external input is sensed, the sensing controller may divide the sensing area into a first area in which the second external input is not applied and a second area in which the second external input is applied in the second mode, and the sensing signal may include a first sensing signal sensed in the first area and a second sensing signal sensed in the second area.

The correction value may be calculated based on the first sensing signal and the second sensing signal, and the correction sensing signal may be obtained by converting the second sensing signal.

The sensing controller may include a data converter that receives an induction signal from the input sensing layer and converts the induction signal to induction data, and a data processor that calculates the sensing signal based on the induction data and measures the biometric information based on the correction sensing signal generated by converting the sensing signal based on the correction value.

The input sensing layer may include a sensing area in which the first external input or the second external input is sensed, the sensing area may include a first area in which the second external input is not applied, and a second area in which the second external input is applied. The data processor may include a sensing portion that generates the sensing signal based on the induction data and divides the sensing signal into a first sensing signal corresponding to the first area and a second sensing signal corresponding to the second area, a correction value generating portion that receives the first sensing signal from the sensing portion and generates the correction value based on the first sensing signal, and a correcting portion that receives the second sensing signal from the sensing portion, receives the correction value from the correction value generating portion, and converts the second sensing signal to the correction sensing signal using the correction value.

The sensing portion may include a calculator that generates the sensing signal based on the induction data, an extractor that receives the sensing signal from the calculator and extracts a reference value from the sensing signal, and a signal divider that receives the sensing signal from the calculator, receives the reference value from the extractor, and divides the sensing signal into the first sensing signal and the second sensing signal with respect to the reference value.

The parameter may include a first parameter. The correction value generating portion may include a first parameter calculator that receives the first sensing signal from the sensing portion and calculates the first parameter based on a difference between a first reference sensing signal and the first sensing signal, and a correction value calculator that receives the first parameter from the first parameter calculator and calculates the correction value based on the first parameter. The first reference sensing signal is sensed in the first area at a first temperature, and the first sensing signal is sensed in the first area when a temperature of the surrounding environment is a second temperature.

The parameter may further include a second parameter. The correction value generating portion may further include a second parameter calculator that receives the second sensing signal from the sensing portion and calculates the second parameter based on a difference between a second reference sensing signal and the second sensing signal. The second reference sensing signal is sensed in the second area at the first temperature. The second sensing signal is sensed in the second area when the temperature of the surrounding environment is the second temperature. The correction value calculator may receive the second parameter from the second parameter calculator and calculates the correction value based on the first and second parameters.

The data processor may further include a measuring portion that receives the correction sensing signal from the correcting portion and measures the biometric information based on the correction sensing signal.

The plurality of sensing electrodes may include a first electrode and a second electrode electrically insulated from the first electrode, and the sensing signal includes a value of capacitance variation between the first electrode and the second electrode.

The display panel may include a display element layer including a light emitting element and an encapsulation layer disposed on the display element layer.

The input sensing layer may be disposed directly on the encapsulation layer.

The parameters may include a parameter of a temperature of the surrounding environment.

Embodiments of the disclosure provide a display device may include a display panel displaying an image, an input sensing layer disposed on the display panel and including a sensing area in which an external input is sensed, and a sensing controller electrically connected to the input sensing layer. The sensing area may include a first area in which the external input is not applied, and a second area in which the external input is applied. The sensing controller may sense a first sensing signal corresponding to the first area and a second sensing signal corresponding to the second area from the input sensing layer and generates information of the external input based on a correction sensing signal generated by converting the second sensing signal using a correction value calculated based on the first sensing signal.

The sensing controller may calculate the correction value based on a difference between a reference sensing signal and the first sensing signal.

The reference sensing signal may have a value determined according to a parameter of surrounding environment.

The parameter may include a temperature of the surrounding environment.

The display panel may include a display element layer including a light emitting element and an encapsulation layer disposed on the display element layer.

The input sensing layer may be disposed directly on the encapsulation layer.

The input sensing layer may include a first electrode and a second electrode electrically insulated from the first electrode. The first sensing signal and the second sensing signal may include a value of capacitance variation between the first electrode and the second electrode.

According to the above, the display device may compensate for a distortion of the sensing signal without being affected by the surrounding environment when measuring the biometric information of the user. Thus, the biometric information of the user is measured without being influenced by the surrounding environment.

BRIEF DESCRIPTION OF THE DRAWINGS

The above and other advantages of the disclosure will become readily apparent by reference to the following detailed description when considered in conjunction with the accompanying drawings wherein:

FIGS. 10A to 10C are conceptual views explaining an operation of the data processor according to an embodiment;

DETAILED DESCRIPTION OF THE EMBODIMENTS

Figure 1:
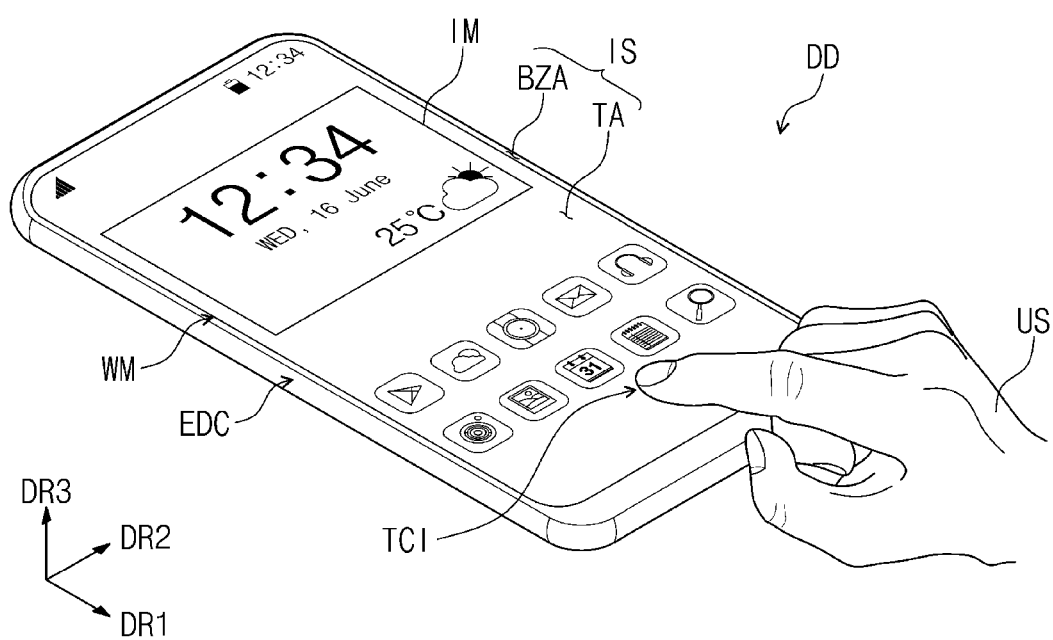
FIG. 1 is a perspective view showing a display device according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description.

Furthermore, the sizes, ratios, etc. of elements in the drawings may be slightly exaggerated for clarity. It should be noted that the same reference numerals are used to designate the same or similar elements throughout the drawings, and repetitive explanation may be omitted.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

Furthermore, the sizes, ratios, etc. of elements in the drawings may be slightly exaggerated for clarity. It should be noted that the same reference numerals are used to designate the same or similar elements throughout the drawings, and repetitive explanation may be omitted.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B.

It will be understood that, although the terms "first," "second," etc., may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

It will be further understood that the terms "comprise", "includes", "have", and their variations, when used in this specification, specify the presence of stated features, integers, steps, operations, elements, and/or components, but do not preclude the presence or addition of one or more other features, integers, steps, operations, elements, components, and/or groups thereof.

In the disclosure, it will be understood that when an element or layer is referred to as being "on", "connected to" or "coupled to" another element or layer, it may be directly on, connected or coupled to the other element or layer or intervening elements or layers may be present.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the drawings, sizes and thicknesses of elements may be enlarged for better understanding, clarity, and ease of description thereof. However, the disclosure is not limited to the illustrated sizes and thicknesses. In the drawings, the thicknesses of layers, films, panels, regions, and other elements, may be exaggerated for clarity. In the drawings, for better understanding and ease of description, the thicknesses of some layers and areas may be exaggerated.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the disclosure will be explained in detail with reference to the accompanying drawings.

Figure 2:
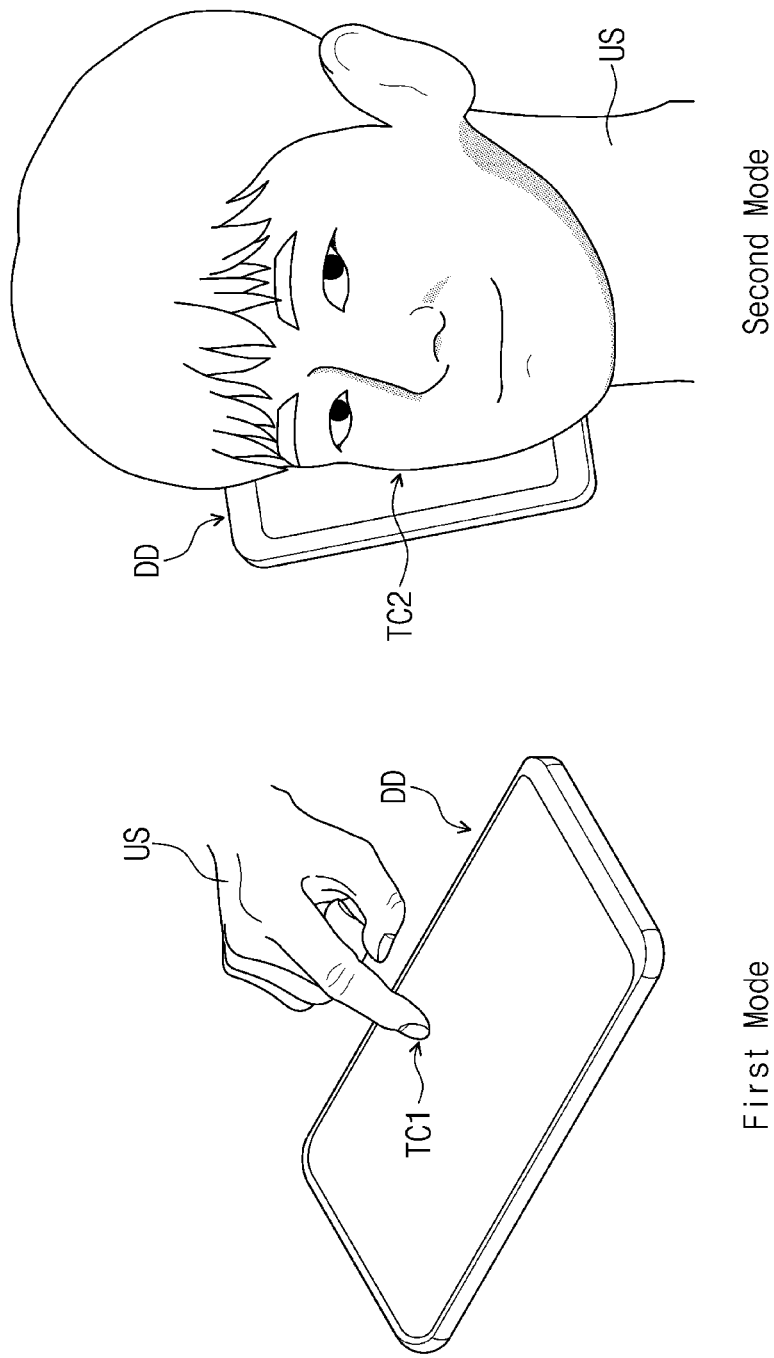
FIG. 2 is a conceptual view showing operation modes of a sensing controller according to an embodiment.
Figure 3:
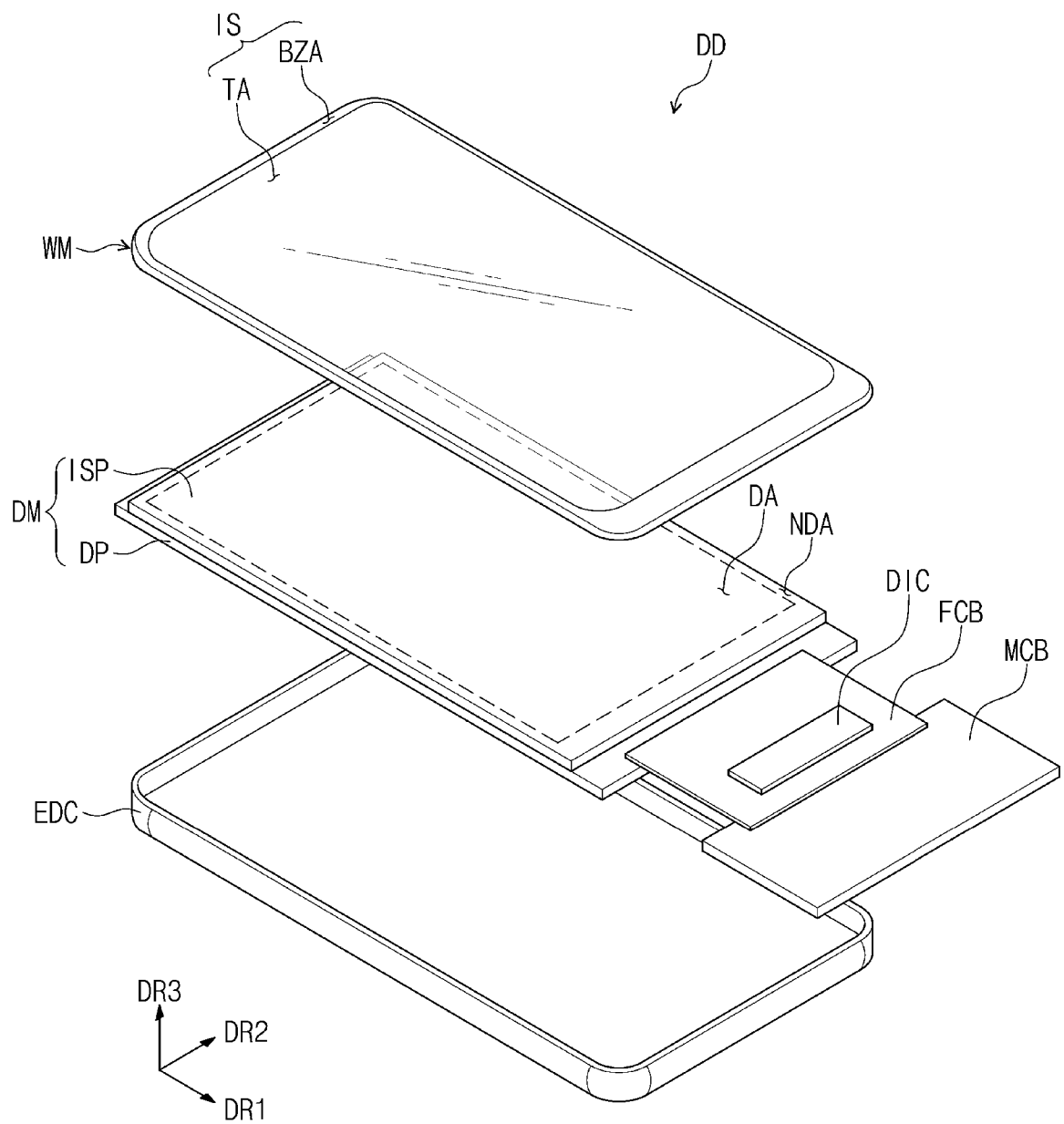
FIG. 3 is an exploded perspective view showing the display device shown in FIG. 1.

FIG. 1 is a perspective view showing a display device DD according to an embodiment. FIG. 2 is a conceptual view showing operation modes of a sensing controller according to embodiments. FIG. 3 is an exploded perspective view showing the display device DD shown in FIG. 1.

Referring to FIGS. 1 to 3, the display device DD may be a device activated in response to electrical signals. The display device DD may be applied to a large-sized display device, such as a television or a monitor, and a small and medium-sized display device, such as a mobile phone, a tablet computer, a car navigation unit, or a game unit. However, these are merely examples, and the display device DD may be applied to other electronic devices as long as they do not depart from the concept of the disclosure.

The display device DD may have a rectangular shape defined by long sides extending in a first direction DR1 and short sides extending in a second direction DR2 crossing or intersecting the first direction DR1. However, the shape of the display device DD should not be limited to the rectangular shape, and the display device DD may have a variety of shapes. The display device DD may display an image IM toward a third direction DR3 through a display surface IS that is substantially parallel to each of the first direction DR1 and the second direction DR2. The display surface IS through which the image IM is displayed may correspond to a front surface of the display device DD.

In the embodiment, front (or upper) and rear (or lower) surfaces of each member are defined with respect to a direction in which the image IM is displayed. The front and rear surfaces are opposite to each other in the third direction DR3, and a line direction of each of the front and rear surfaces may be substantially parallel to the third direction DR3.

A distance in the third direction DR3 between the front surface and the rear surface may correspond to a thickness in the third direction DR3 of the display device DD. Meanwhile, the first, second, and third directions DR1, DR2, and DR3 are relative to each other and may be changed to other directions.

The display device DD may sense an external input applied thereto from the outside. The external input includes various forms of inputs provided from the outside of the display device DD. For example, the display device DD may sense a first external input TC1 applied thereto from the outside in a first mode. The first external input TC1 may include one of various external inputs, such as a body part of a user US, light, heat, and pressure, etc., or a combination thereof. In the embodiment, a touch input applied to the front surface by a hand of the user US will be described as the first external input TC1 of the user US as an example, however, the disclosure is not limited thereto, and the first external input TC1 of the user US may be provided in various ways. The display device DD may sense the first external input TC1 of the user US which is applied to a side surface or rear surface of the display device DD, however, the disclosure is not limited thereto. For example, the display device DD may sense a position of the first external input TC1, e.g., coordinate information, in the first mode.

According to an embodiment, the first external input TC1 may further include inputs generated by an input device, e.g., a stylus pen, an active pen, a touch pen, an electronic pen, an e-pen, or the like in addition to the hand of the user US.

The display device DD may sense a second external input TC2 applied thereto from the outside in a second mode. The second external input TC2 may be a touch input generated by the hand of the user US as the first external input TC1 or may be a touch input by another part of the body other than the hand of the user US, for example, a face, a forearm, a calf, a thigh, etc. In the embodiment, a touch input generated by the face of the user US and applied to the front surface of the display device DD will be described as the second external input TC2 as an example, however, the disclosure is not limited thereto. As described above, the second external input TC2 of the user US may be provided in various forms. The display device DD may sense the second external input TC2 applied to a side surface or a rear surface of the display device DD according to a structure of the display device DD, however, the disclosure is not limited thereto. The display device DD may measure biometric information, such as a moisture level, a degree of skin aging, etc., of the user US based on the second external input TC2 of the second mode.

The front surface of the display device DD may include a transmission area TA and a bezel area BZA. The transmission area TA may be an area through which the image IM is displayed. The user US may view the image IM through the transmission area TA. In the embodiment, the transmission area TA may have a quadrangular shape with rounded vertices, however, the disclosure is not limited thereto. The transmission area TA may have a variety of shapes and should not be particularly limited.

The bezel area BZA may be defined or formed adjacent to the transmission area TA. The bezel area BZA may have a predetermined color. The bezel area BZA may be adjacent to or surround the transmission area TA. Accordingly, the transmission area TA may have a shape defined by the bezel area BZA, however, the disclosure is not limited thereto. According to an embodiment, the bezel area BZA may be disposed adjacent to only one side of the transmission area TA or may be omitted. According to an embodiment, the display device DD may include various embodiments and should not be particularly limited.

As shown in FIG. 3, the display device DD may include a display module DM and a window WM disposed on the display module DM. The display module DM may include a display panel DP that displays the image in response to electrical signals and an input sensing layer ISP that transmits/receives information on the external input.

The display panel DP according to the embodiment of the disclosure may be a light-emitting type display panel. For instance, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot or a quantum rod. Hereinafter, the organic light emitting display panel will be described as an example of the display panel DP.

The display panel DP may output the image IM, and the output image IM may be displayed through the display surface IS.

The input sensing layer ISP may be disposed on the display panel DP and may sense the first and second external inputs TC1 and TC2. The configuration and operation of the input sensing layer ISP will be described with reference to FIGS. 5 and 6.

The window WM may include a transparent material that transmits the image IM. As an example, the window WM may include a glass, sapphire, or plastic material. The window WM may have a single-layer structure, however, the disclosure is not limited thereto, and the window WM may include layers.

Meanwhile, although not shown in figures, the bezel area BZA of the display device DD may be defined or formed by printing a material having a predetermined color on an area of the window WM. As an example, the window WM may include a light blocking pattern to define the bezel area BZA. The light blocking pattern may be a colored organic layer and may be formed through a coating method.

The window WM may be coupled with the display module DM by an adhesive film. As an example, the adhesive film may include an optically clear adhesive film (OCA). However, the adhesive film should not be limited thereto, and the adhesive film may include an ordinary adhesive. For example, the adhesive film may include an optically clear resin (OCR) or a pressure sensitive adhesive film (PSA).

An anti-reflective layer may be further disposed between the window WM and the display module DM. The anti-reflective layer may reduce a reflectance of an external light incident thereto from above of the window WM. According to an embodiment of the disclosure, the anti-reflective layer may include a retarder and a polarizer. The retarder may be a film type or liquid crystal coating type and may include a $\lambda/2$ retarder and/or a $\lambda/4$ retarder. The polarizer may be a film type or liquid crystal coating type. The film type polarizer and retarder may include a stretching type synthetic resin film, and the liquid crystal coating type polarizer and retarder may include liquid crystals aligned in a predetermined alignment. The retarder and the polarizer may be implemented as one polarizing film.

As an example, the anti-reflective layer may include color filters. Arrangements of the color filters may be determined by taking into account colors of lights generated by a plurality of pixels included in the display panel DP. The anti-reflective layer may further include a light blocking pattern.

The display panel DP may include a display area DA and a non-display area NDA. The display area DA may be an area from which the image IM provided from the display panel DP exits.

The non-display area NDA may be defined or formed adjacent to the display area DA. As an example, the non-display area NDA may be adjacent to or surround the display area DA, however, the disclosure is not limited thereto. According to an embodiment, the non-display area NDA may be provided in a variety of shapes. According to an embodiment, the display area DA of the display panel DP may correspond to at least a portion of the transmission area TA.

The display module DM may further include a main circuit board MCB, a flexible circuit film FCB, and a driving chip DIC. The main circuit board MCB may extend to the flexible circuit film FCB and may be electrically connected to the display panel DP. The flexible circuit film FCB may extend to the display panel DP and may electrically connect the display panel DP to the main circuit board MCB.

The main circuit board MCB may include driving elements. The driving elements may include a circuit to drive the display panel DP. The driving chip DIC may be mounted on the flexible circuit film FCB. According to an embodiment, flexible circuit films FCB may be provided, and the flexible circuit films FCB may be electrically connected to the display panel DP. FIG. 3 shows the driving chip DIC is mounted on the flexible circuit film FCB, however, the disclosure should not be limited thereto. For example, the driving chip DIC may be disposed directly on the display panel DP. In this case, a portion of the display panel DP on which the driving chip DIC is mounted may be bent to be disposed on a rear surface of the display module DM. The driving chip DIC may be disposed directly on the main circuit board MCB.

The input sensing layer ISP may also be electrically connected to the main circuit board MCB via the flexible circuit film FCB, however, the disclosure is not limited thereto. For example, the display module DM may further include a separate flexible circuit film to electrically connect the input sensing layer ISP to the main circuit board MCB.

The display device DD may further include an external case EDC accommodating the display module DM. The window WM may be disposed in the external case EDC. The external case EDC may absorb impacts applied thereto from the outside and may prevent foreign substance and moisture from entering the display module DM to protect components accommodated in the external case EDC. Meanwhile, as an example, the external case EDC may be provided in a form in which storage members are combined with each other.

According to an embodiment, the display device DD may further include an electronic module including various functional modules to operate the display module DM, a power supply module supplying a power required for an overall operation of the display device DD, and a bracket coupled to the external case EDC to divide an inner space of the display device DD.

Figure 4:
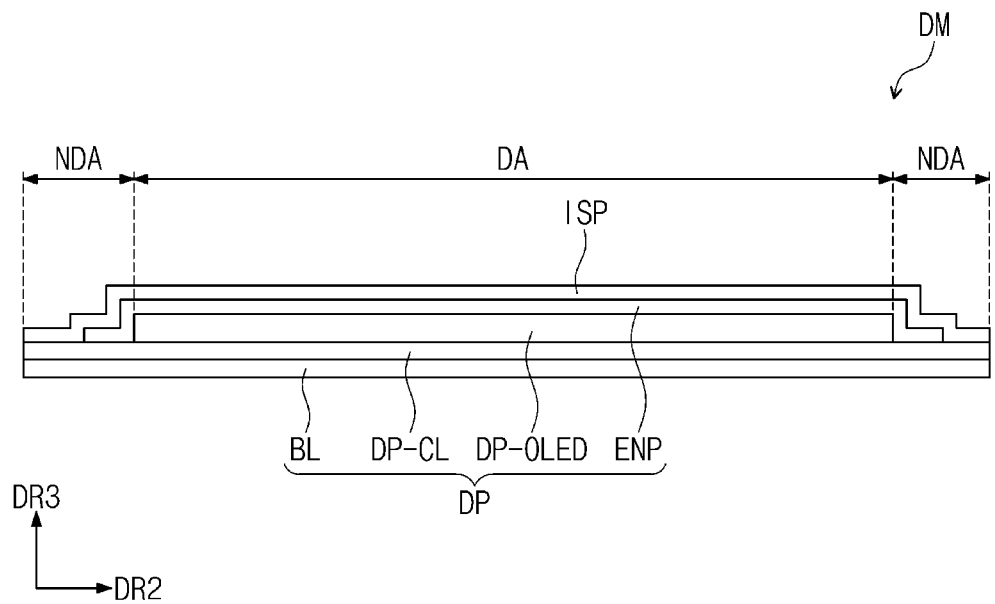
FIG. 4 is a schematic cross-sectional view showing a display module shown in FIG. 3.

FIG. 4 is a schematic cross-sectional view showing the display module DM shown in FIG. 3.

Referring to FIG. 4, the display module DM may include the display panel DP and the input sensing layer ISP. The display panel DP may include a base layer BL, a circuit element layer DP-CL, a display element layer DP-OLED, and an encapsulation layer ENP. The circuit element layer DP-CL, the display element layer DP-OLED, and the encapsulation layer ENP may be disposed on the base layer BL. Although not shown in figures, the display panel DP may further include functional layers, such as an anti-reflective layer, a refractive index adjustment layer, etc.

The base layer BL may include at least one synthetic resin layer. The base layer BL may include a glass material substrate, a metal material substrate, or an organic/inorganic composite material substrate. As an example, the base layer BL may be a flexible layer. The display area DA and the non-display area NDA described with reference to FIG. 3 may be applied to the base layer BL in a same way.

The circuit element layer DP-CL may be disposed on the base layer BL. The circuit element layer DP-CL may include at least one intermediate insulating layer and a circuit element. The intermediate insulating layer may include at least one intermediate inorganic layer and at least one intermediate organic layer. The circuit element may include signal lines and a pixel driving circuit.

The display element layer DP-OLED may be disposed on the circuit element layer DP-CL. The display element layer DP-OLED may include light emitting elements. The light emitting elements may include organic light emitting diodes. The display element layer DP-OLED may further include an organic layer such as a pixel definition layer.

The encapsulation layer ENP may encapsulate the display element layer DP-OLED. The encapsulation layer ENP may include at least one inorganic layer. The encapsulation layer ENP may further include at least one organic layer. The inorganic layer may protect the display element layer DP-OLED from moisture and oxygen, and the organic layer may protect the display element layer DP-OLED from a foreign substance such as dust particles. The inorganic layer may include a silicon nitride layer, a silicon oxynitride layer, a silicon oxide layer, a titanium oxide layer, or an aluminum oxide layer. The organic layer may include an acrylic-based organic layer, however, the disclosure is not limited thereto.

The input sensing layer ISP may be formed on the display panel DP through successive processes. The input sensing layer ISP may have a single-layer structure or a multi-layer structure. The input sensing layer ISP may have a single-layer structure of an insulating layer or a multi-layer structure of insulating layers. According to an embodiment, in the case where the input sensing layer ISP is disposed directly on the display panel DP through the successive processes, the input sensing layer ISP may be disposed directly on the encapsulation layer ENP, and an adhesive film may not be disposed between the input sensing layer ISP and the display panel DP. However, according to an embodiment, the adhesive film may be disposed between the input sensing layer ISP and the display panel DP. In this case, the input sensing layer ISP may not be manufactured through the successive processes with the display panel DP, and the input sensing layer ISP may be fixed to an upper surface of the display panel DP by the adhesive film after being manufactured through a separate process.

According to an embodiment, the display panel DP may further include an encapsulation substrate. The encapsulation substrate may be disposed on the display element layer DP-OLED to face the base layer BL. The encapsulation substrate may include a plastic substrate, a glass substrate, a metal substrate, or an organic/inorganic composite material substrate. A sealant may be disposed between the encapsulation substrate and the base layer BL, and the encapsulation substrate and the base layer BL may be coupled with each other by the sealant. The sealant may include an organic adhesive or a frit that is a ceramic adhesive material. The display element layer DP-OLED may be encapsulated by the sealant and the encapsulation substrate.

In the case where the input sensing layer ISP is disposed directly on the display panel DP through successive processes, the input sensing layer ISP may be disposed directly on the encapsulation substrate. However, according to an embodiment, in the case where the adhesive film is disposed between the input sensing layer ISP and the display panel DP, the input sensing layer ISP may be fixed to an upper surface of the encapsulation substrate by the adhesive film.

Figure 5:
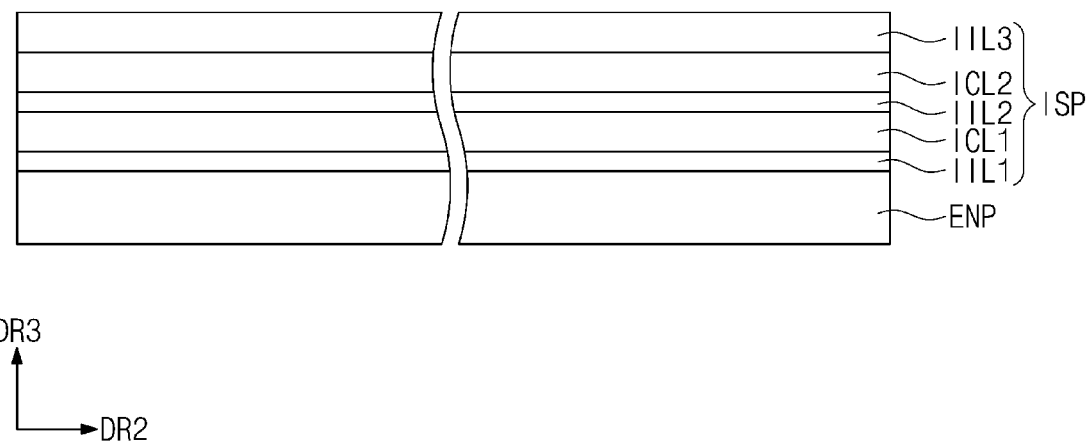
FIG. 5 is a schematic cross-sectional view showing an input sensing layer according to an embodiment.
Figure 6:
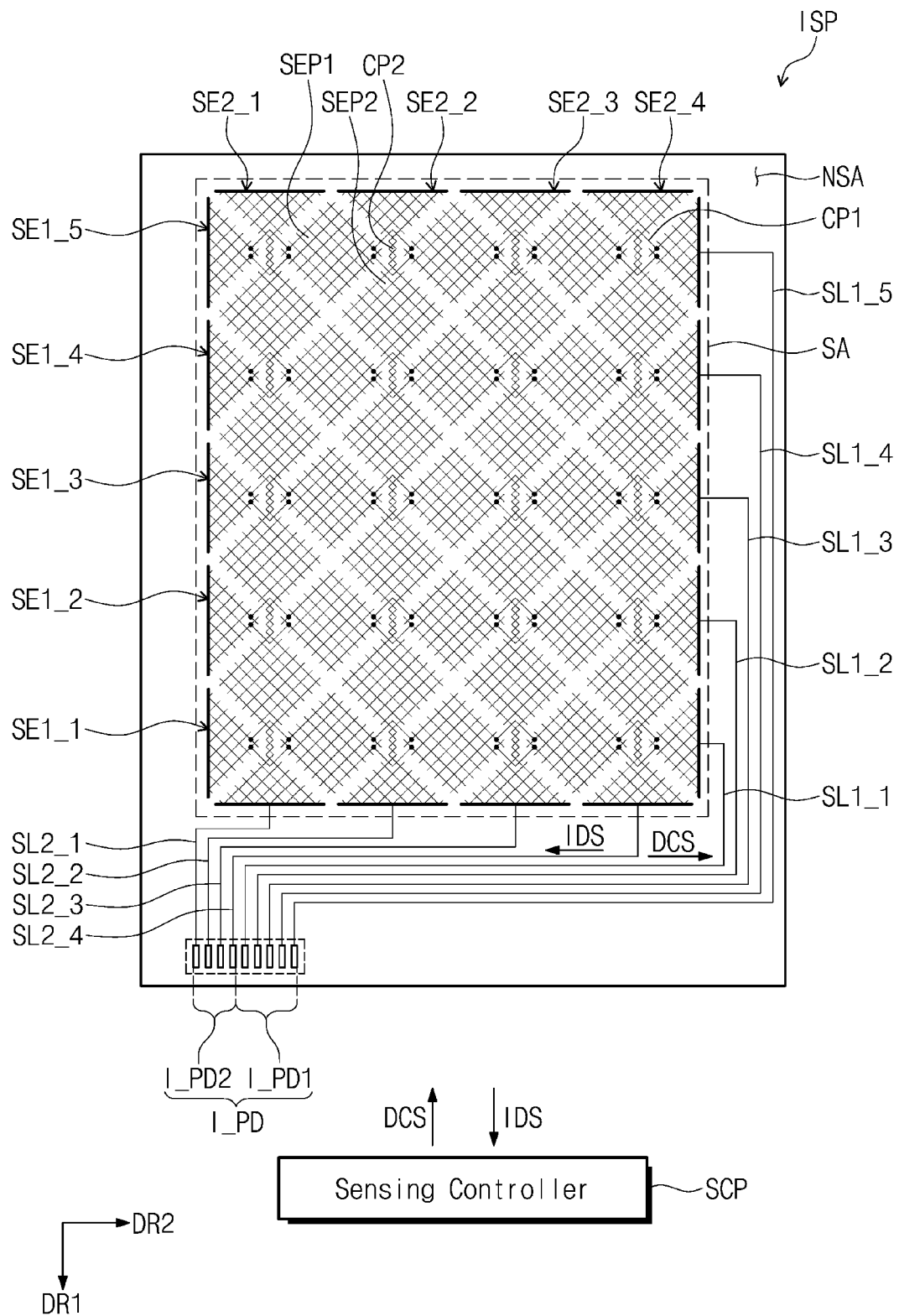
FIG. 6 is a schematic plan view showing an input sensing layer according to an embodiment.

FIG. 5 is a schematic cross-sectional view showing the input sensing layer ISP according to an embodiment of the disclosure. FIG. 6 is a schematic plan view showing the input sensing layer ISP according to an embodiment of the disclosure.

Referring to FIGS. 5 and 6, the input sensing layer ISP may include a first sensing insulating layer IIL1, a first conductive layer ICL1, a second sensing insulating layer IIL2, a second conductive layer ICL2, and a third sensing insulating layer IIL3. The first sensing insulating layer IIL1 may be disposed directly on the encapsulation layer ENP. According to an embodiment, the first sensing insulating layer IIL1 may be omitted.

Each of the first conductive layer ICL1 and the second conductive layer ICL2 may include conductive patterns. The conductive patterns may include sensing electrodes SE1_1 to SE1_5 and SE2_1 to SE2_4 and signal lines SL1_1 to SL1_5 and SL2_1 to SL2_4 electrically connected to the sensing electrodes SE1_1 to SE1_5 and SE2_1 to SE2_4.

Each of the first sensing insulating layer IIL1, the second sensing insulating layer ILL2, and the third sensing insulating layer IIL3 may include an inorganic material or an organic material. In the embodiment, each of the first sensing insulating layer IIL1 and the second sensing insulating layer IIL2 may be an inorganic layer. The inorganic layer may include at least one of aluminum oxide, titanium oxide, silicon oxide, silicon oxynitride, zirconium oxide, and hafnium oxide. The inorganic layer may have a thickness of about 1000 angstroms to about 4000 angstroms.

The third sensing insulating layer IIL3 may be an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin. The third sensing insulating layer IIL3 including the organic material may prevent moisture from entering the first conductive layer ICL1 and the second conductive layer ICL2 from the outside.

According to an embodiment, the input sensing layer ISP may include a sensing area SA and a non-sensing area NSA adjacent to the sensing area SA. As an example, the sensing area SA may correspond to at least a portion of the display area DA (refer to FIG. 2) of the display panel DP (refer to FIG. 2).

The sensing electrodes SE1_1 to SE1_5 and SE2_1 to SE2_4 may be disposed in the sensing area SA, and the signal lines SL1_1 to SL1_5 and SL2_1 to SL2_4 may be disposed in the non-sensing area NSA.

As an example, the sensing electrodes SE1_1 to SE1_5 and SE2_1 to SE2_4 may include transmission electrodes SE1_1 to SE1_5 and reception electrodes SE2_1 to SE2_4.

The signal lines SL1_1 to SL1_5 and SL2_1 to SL2_4 may include transmission signal lines SL1_1 to SL1_5 electrically connected to the transmission electrodes SE1_1 to SE1_5 and reception signal lines SL2_1 to SL2_4 electrically connected to the reception electrodes SE2_1 to SE2_4.

The transmission electrodes SE1_1 to SE1_5 may cross the reception electrodes SE2_1 to SE2_4. The transmission electrodes SE1_1 to SE1_5 may be arranged or disposed in the first direction DR1 and may extend in the second direction DR2. The reception electrodes SE2_1 to SE2_4 may be arranged or disposed in the second direction DR2 and may extend in the first direction DR1.

The input sensing layer ISP may obtain coordinate information by a mutual capacitance method. A capacitor (not shown) may be formed between the transmission electrodes SE1_1 to SE1_5 and the reception electrodes SE2_1 to SE2_4. A capacitance of the capacitor between the transmission electrodes SE1_1 to SE1_5 and the reception electrodes SE2_1 to SE2_4 may be changed by the first external input TC1 (refer to FIG. 2) or the second external input TC2 (refer to FIG. 2). The sensitivity of the input sensing layer ISP may be determined depending on a variation in capacitance.

Each of the transmission electrodes SE1_1 to SE1_5 may include first sensor portions SEP1 and first connection portions CP1, which are arranged or disposed in the sensing area SA. Each of the reception electrodes SE2_1 to SE2_4 may include second sensor portions SEP2 and second connection portions CP2, which are arranged or disposed in the sensing area SA.

In one or a transmission electrode of the transmission electrodes SE1_1 to SE1_5, the first sensor portions SEP1 may be arranged or disposed in the second direction DR2, and in one or a reception electrode of the reception electrodes SE2_1 to SE2_4, the second sensor portions SEP2 may be arranged or disposed in the first direction DR1. Each of the first connection portions CP1 may connect the first sensor portions SEP1 adjacent to each other, and each of the second connection portions CP2 may connect the second sensor portions SEP2 adjacent to each other.

The transmission electrodes SE1_1 to SE1_5 and the reception electrodes SE2_1 to SE2_4 may have a mesh shape or the like. As the transmission electrodes SE1_1 to SE1_5 and the reception electrodes SE2_1 to SE2_4 have the mesh shape or the like, a parasitic capacitance between electrodes included in the display panel DP (refer to FIG. 3) and the transmission electrodes SE1_1 to SE1_5 and the reception electrodes SE2_1 to SE2_4 may be reduced.

The transmission electrodes SE1_1 to SE1_5 and the reception electrodes SE2_1 to SE2_4 may include silver, aluminum, copper, chromium, nickel, titanium, or the like, however, materials for the transmission electrodes SE1_1 to SE1_5 and the reception electrodes SE2_1 to SE2_4 should not be limited thereto.

The transmission signal lines SL1_1 to SL1_5 and the reception signal lines SL2_1 to SL2_4 may be disposed in the non-sensing area NSA.

The input sensing layer ISP may include input pads I_PD extending from ends of the transmission signal lines SL1_1 to SL1_5 and the reception signal lines SL2_1 to SL2_4 and disposed in the non-sensing area NSA. The input pads I_PD may be electrically connected to the transmission signal lines SL1_1 to SL1_5 and the reception signal lines SL2_1 to SL2_4. As an example, the input pads I_PD may include a transmission input pad I_PD1 electrically connected to the transmission signal lines SL1_1 to SL1_5 and a reception input pad I_PD2 electrically connected to the reception signal lines SL2_1 to SL2_4.

The display device DD may further include a sensing controller SCP to control an operation of the input sensing layer ISP.

As an example, the sensing controller SCP may be electrically connected to the input sensing layer ISP. The sensing controller SCP may be electrically connected to the transmission signal lines SL1_1 to SL1_5 and the reception signal lines SL2_1 to SL2_4 via the input pads I_PD.

The sensing controller SCP may transmit a driving control signal DCS to the transmission electrodes SE1_1 to SE1_5 and may receive an induction signal IDS read out from the reception electrodes SE2_1 to SE2_4. As an example, the driving control signal DCS may be a sensing scan signal sequentially transmitted to each of the transmission electrodes SE1_1 to SE1_5. The induction signal IDS may be a signal induced to the reception electrodes SE2_1 to SE2_4 by the capacitor formed between the transmission electrodes SE1_1 to SE1_5 and the reception electrodes SE2_1 to SE2_4.

As an example, the sensing controller SCP may be operated in the first mode that senses a position to which the first external input TC1 (refer to FIG. 2) is applied or the second mode that measures the biometric information with respect to the second external input TC2 (refer to FIG. 2) applied to the input sensing layer ISP. Hereinafter, the configuration and structure of the sensing controller SCP will be described with reference to FIGS. 7 to 9.

Figure 7:
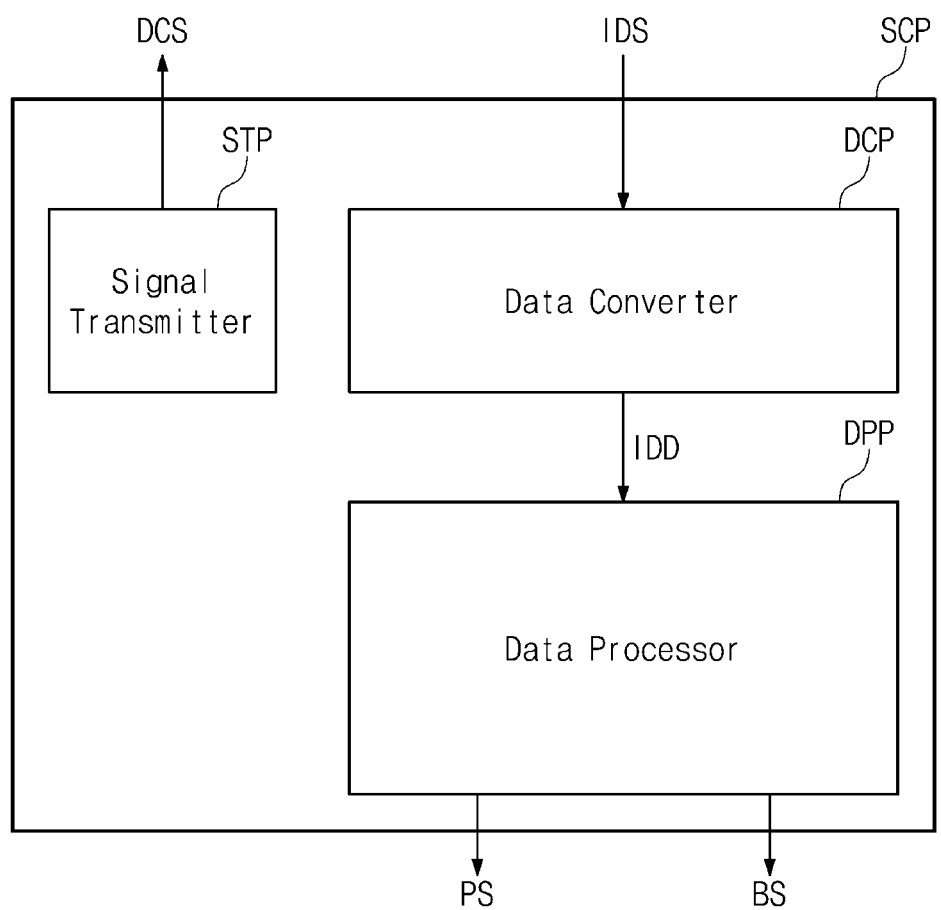
FIG. 7 is a block diagram showing a sensing controller according to an embodiment.

FIG. 7 is a block diagram showing the sensing controller SCP according to an embodiment of the disclosure.

Referring to FIG. 7, the sensing controller SCP may include a signal transmitter STP, a data converter DCP, and a data processor DPP.

The signal transmitter STP may transmit the driving control signal DCS to the input sensing layer ISP. As an example, the signal transmitter STP may transmit the driving control signal DCS to the transmission electrodes SE1_1 to SE1_5. As an example, the signal transmitter STP may determine a timing at which the driving control signal DCS is transmitted to the transmission electrodes SE1_1 to SE1_5 based on operation information of the display panel DP (refer to FIG. 3).

The data converter DCP may receive the induction signal IDS from the input sensing layer ISP. As an example, the data converter DCP may receive the induction signal IDS from the reception electrodes SE2_1 to SE2_4. As an example, the induction signal IDS may be an analog signal or a digital signal. The data converter DCP may convert the induction signal IDS into the digital signal that may be processed by the data processor DPP, e.g., induction data IDD.

The data processor DPP may receive the induction data IDD from the data converter DCP. In a case that the sensing controller SCP is operated in the first mode, the data processor DPP may sense a position to which the first external input TC1 (refer to FIG. 2) is applied based on the induction data IDD and may generate a position signal PS including information about the position. In a case that the sensing controller SCP is operated in the second mode, the data processor DPP may measure the biometric information about the second external input TC2 (refer to FIG. 2) based on the induction data IDD and may generate a biometric information signal BS including the biometric information.

Figure 8:
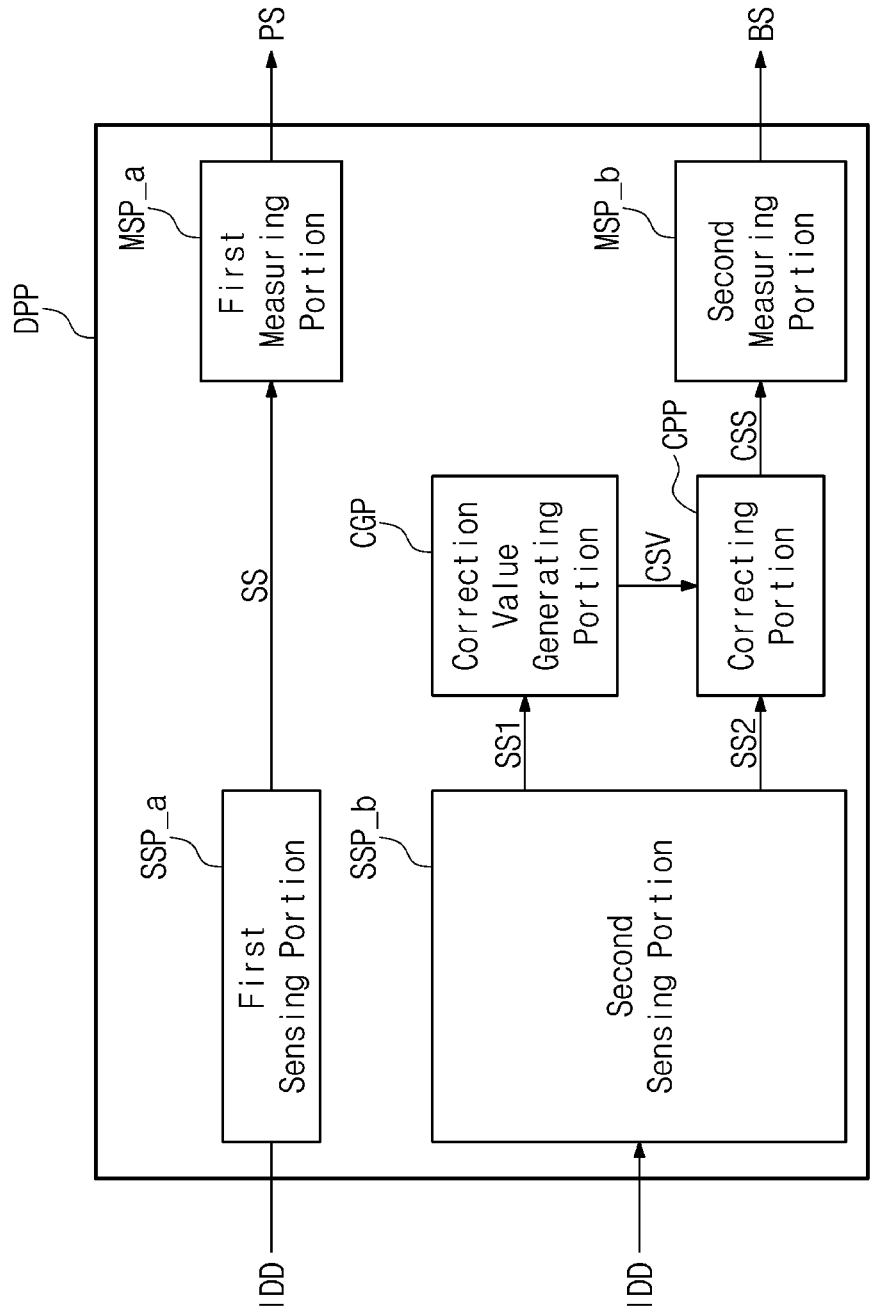
FIG. 8 is a block diagram showing a data processor according to an embodiment.

FIG. 8 is a block diagram showing the data processor DPP according to an embodiment of the disclosure.

Referring to FIG. 8, the data processor DPP may include a first sensing portion SSP_a and a first measuring portion MSP_a.

In a case that the sensing controller SCP (refer to FIG. 7) is operated in the first mode, the first sensing portion SSP_a may receive the induction data IDD from the data converter DCP (refer to FIG. 7). The first sensing portion SSP_a may generate a sensing signal SS based on the induction data IDD. As an example, the sensing signal SS may include information on an amount or a value of capacitance variation between the transmission electrodes SE1_1 to SE1_5 and the reception electrodes SE2_1 to SE2_4, which is caused by the first external input TC1 (refer to FIG. 2), at each position in the sensing area SA (refer to FIG. 6). As an example, the sensing signal SS may be generated by comparing the induction data IDD in a case that the first external input TC1 is not applied to the display device DD and with the induction data IDD in a case that the first external input TC1 is applied to the display device DD.

The first measuring portion MSP_a may receive the sensing signal SS from the first sensing portion SSP_a. The first measuring portion MSP_a may calculate the position to which the first external input TC1 is applied based on the sensing signal SS and may generate the position signal PS including the information on the position.

The data processor DPP may further include a second sensing portion SSP_b, a correction value generating portion CGP, a correcting portion CPP, and a second measuring portion MSP_b.

In a case that the sensing controller SCP is operated in the second mode, the second sensing portion SSP_b may receive the induction data IDD from the data converter DCP. The second sensing portion SSP_b may generate the sensing signal SS (refer to FIG. 9) based on the induction data IDD. The second sensing portion SSP_b may divide the sensing signal SS into a first sensing signal SS1 and a second sensing signal SS2. As an example, the first sensing signal SS1 may be a sensing signal corresponding to a first area AR1 (refer to FIG. 10B) where the second external input TC2 is not applied in the sensing area SA. As an example, the second sensing signal SS2 may be a sensing signal corresponding to a second area AR2 (refer to FIG. 10B) where the second external input TC2 is applied in the sensing area SA. In FIG. 8, the first sensing portion SSP_a and the second sensing portion SSP_b are shown as components independent from each other, however, the disclosure is not limited thereto. For example, the first sensing portion SSP_a and the second sensing portion SSP_b may be included in a same component.

The correction value generating portion CGP may receive the first sensing signal SS1 from the second sensing portion SSP_b. The correction value generating portion CGP may calculate a correction value CSV based on the first sensing signal SS1.

The correcting portion CPP may receive the, second sensing signal SS2 from the second sensing portion SSP_b and may receive the correction value CSV from the correction value generating portion CGP. The correcting portion CPP may convert the second sensing signal S2 based on the correction value CSV to generate a correction sensing signal CSS.

The second measuring portion MSP_b may receive the correction sensing signal CSS from the correcting portion CPP. The second measuring portion MSP_b may calculate the biometric information on the second external input TC2 based on the correction sensing signal CSS. The second measuring portion MSP_b may generate the biometric information signal BS including the biometric information.

Figure 9:
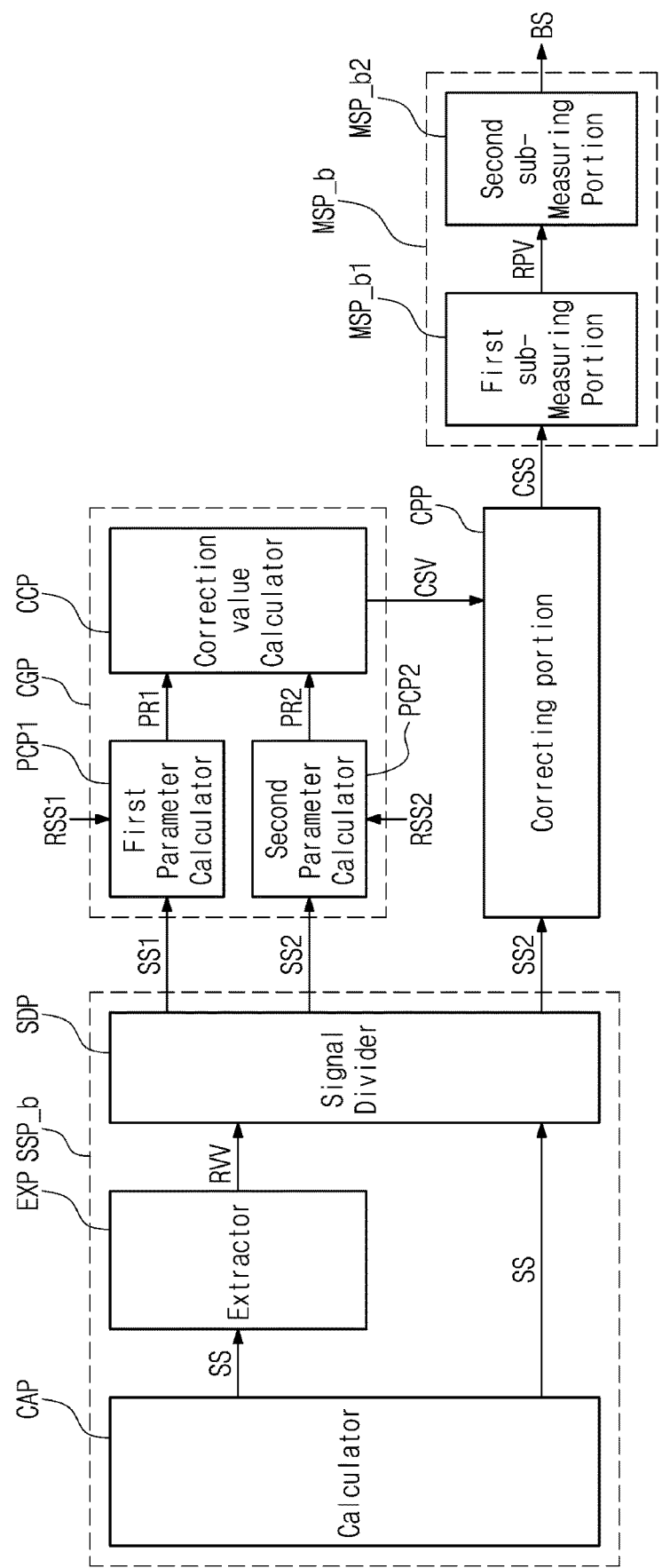
FIG. 9 is a block diagram showing a second sensing portion, a correction value generating portion, and a second measuring portion according to an embodiment.
Figure 10B:
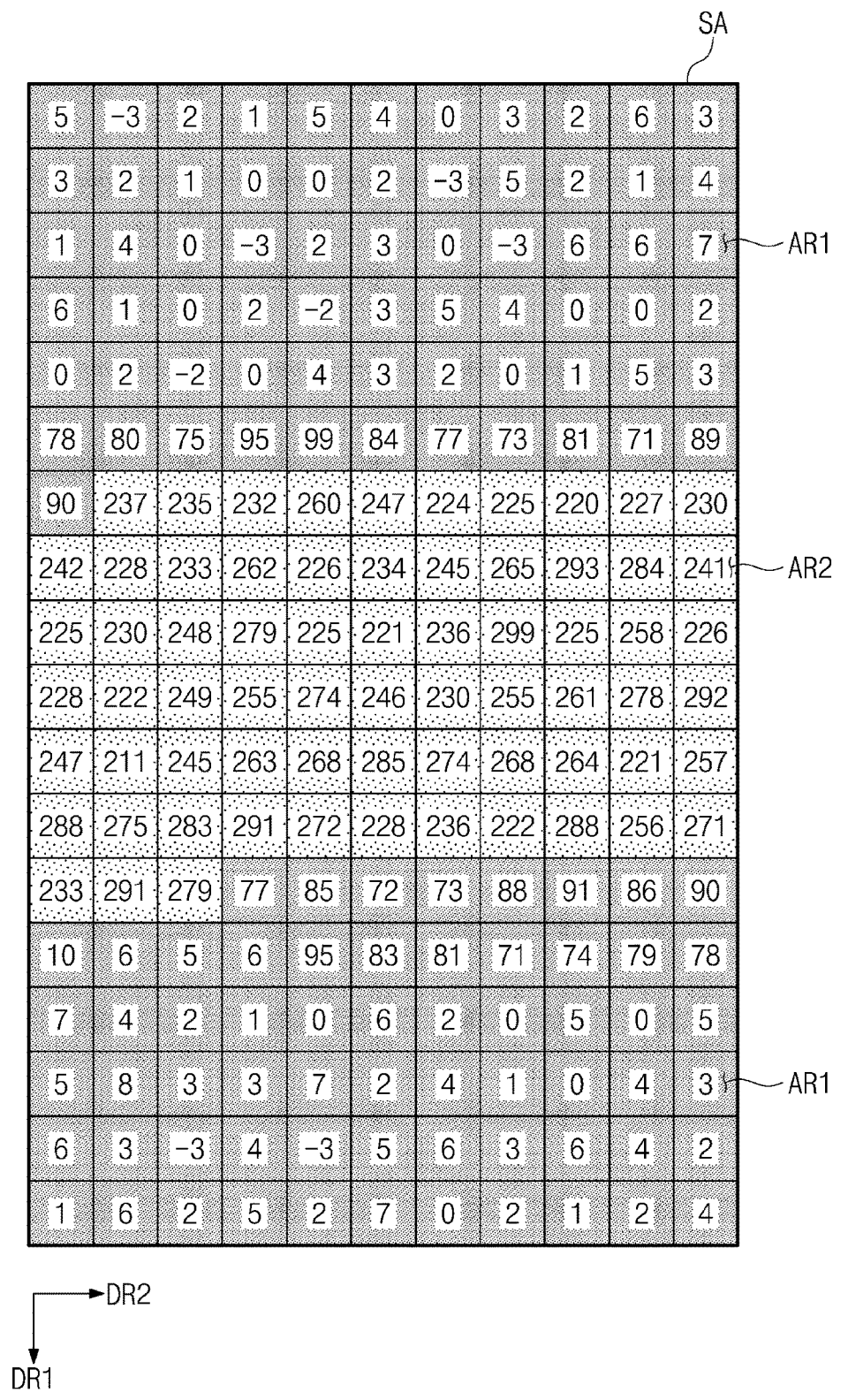
Figure 11A:
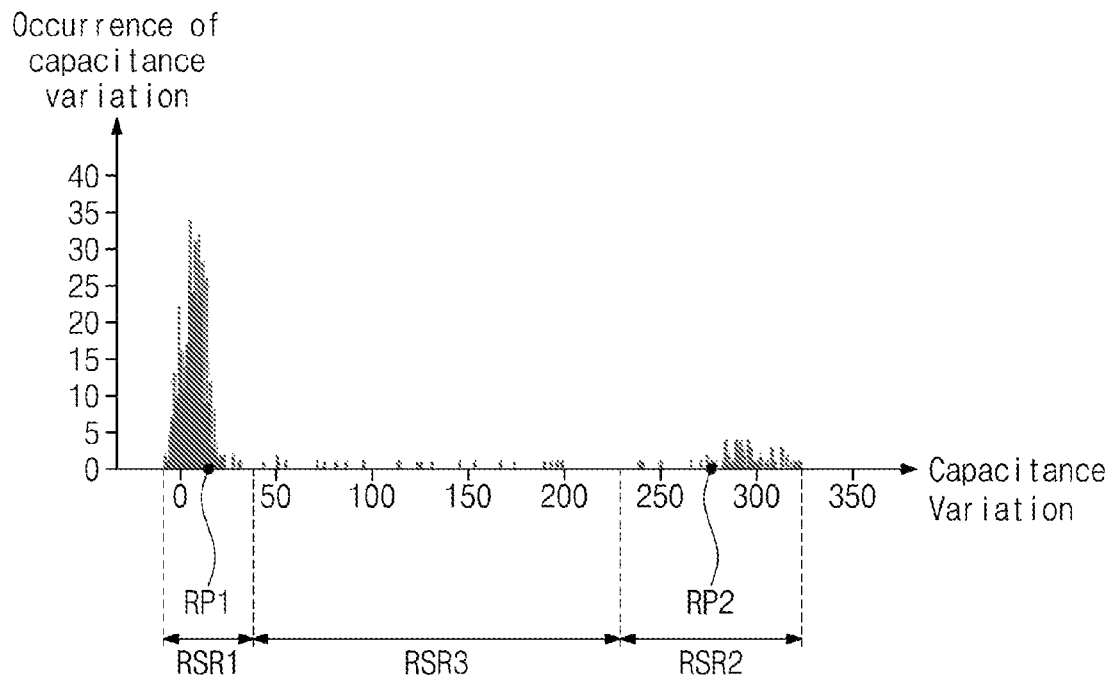
FIGS. 11A and 11B are graphs explaining an operation of the correction value generating portion according to an embodiment.
Figure 11B:
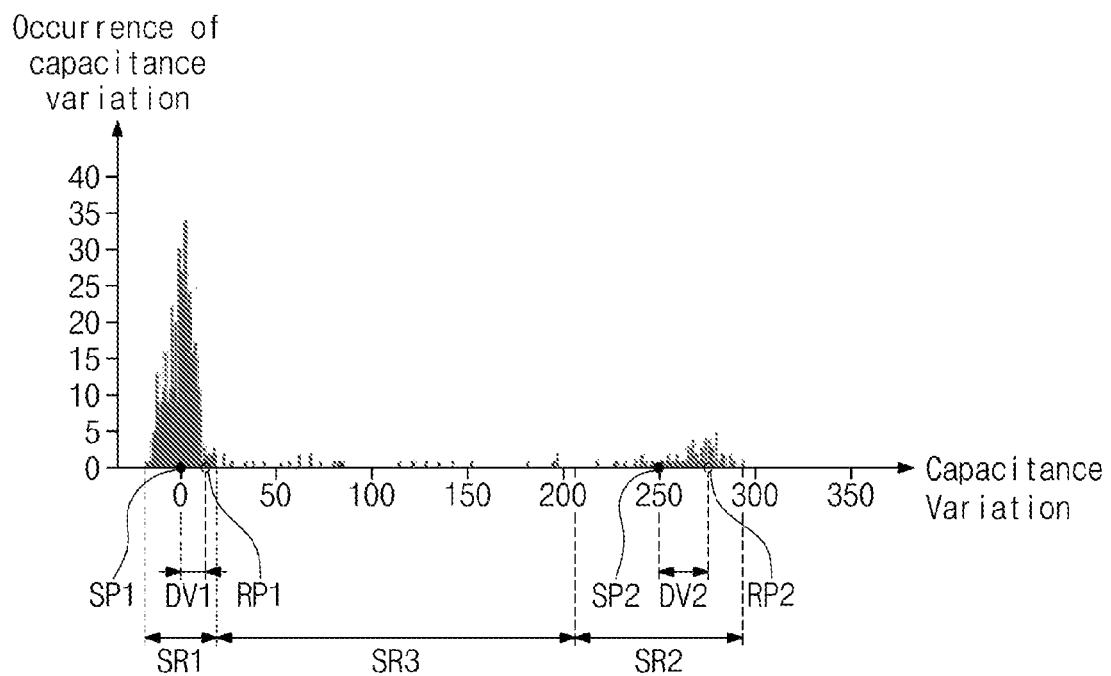

FIG. 9 is a block diagram showing the second sensing portion SSP_b, the correction value generating portion CGP, and the second measuring portion MSP_b according to an embodiment of the disclosure. FIGS. 10A to 10C are conceptual views explaining an operation of the data processor DPP according to embodiments of the disclosure. FIGS. 11A and 11B are graphs explaining an operation of the correction value generating portion CGP according to embodiments of the disclosure. In FIGS. 9 to 11B, the same reference numerals denote the same elements in FIG. 8, and thus, detailed descriptions of the same elements will be omitted. In addition, the operation of the data processor DPP when the sensing controller SCP (refer to FIG. 7) is operated in the second mode will be described.

Referring to FIG. 9, the second sensing portion SSP_b may include a calculator CAP, an extractor EXP, and a signal divider SDP. As an example, the calculator CAP may receive the induction data IDD from the data converter DCP (refer to FIG. 7). The calculator CAP may generate the sensing signal SS based on the induction data IDD.

Referring to FIGS. 9, 10A, and 10B, the extractor EXP may receive the sensing signal SS from the calculator CAP. The extractor EXP may extract a reference value RVV from the sensing signal SS. As an example, the reference value RVV may be a value that serves as a reference to divide the sensing area SA into the first area AR1 and the second area AR2. As an example, the first area AR1 may correspond to an area where the second external input TC2 is not applied to the display device DD (refer to FIG. 1), and the second area AR2 may correspond to an area where the second external input TC2 is applied to the display device DD. FIG. 10A shows capacitance variations for each position of the sensing area SA included in the sensing signal SS. As an example, the capacitance variations of the second area AR2 may be greater than the capacitance variations of the first area AR1. The extractor EXP may extract a maximum capacitance variation MAXV that is the greatest value among the capacitance variations included in the sensing signal SS and may generate the reference value RVV based on the maximum capacitance variation MAXV. As an example, the extractor EXP may generate a value of a certain rate of the maximum capacitance variation MAXV as the reference value RVV. Referring to FIG. 10A, the extractor EXP may extract '299' that is the greatest value among the capacitance variations included in the sensing signal SS as the maximum capacitance variation MAXV. The extractor EXP may generate '209.3' that is a value corresponding to about 70% of the maximum capacitance variation MAXV having a value of '299' as the reference value RVV.

Referring to FIGS. 9 and 10C, as an example, the reference value RVV may include a first reference value and a second reference value. The extractor EXP may generate the first reference value and the second reference value based on the maximum capacitance variation MAXV. The first reference value may serve as a reference value used to distinguish the second area AR2 from a third area AR3, and the second reference value may serve as a reference value used to distinguish the first area AR1 from the third area AR3. The third area AR3 may be an area to which noises caused by a surrounding environment are applied when the second external input TC2 is provided to the display device DD. As an example, the first reference value may be generated by multiplying the maximum capacitance variation MAXV by a first rate, and the second reference value may be generated by multiplying the maximum capacitance variation MAXV by a second rate. The first rate may be greater than the second rate. As an example, the extractor EXP may generate '209.3' that is the value corresponding to about 70% of the maximum capacitance variation MAXV having the value of '299' as the first reference value and may generate '20.9' that is the value corresponding to about 7% of the maximum capacitance variation MAXV having the value of '299' as the second reference value '299'.

The second area AR2 may correspond to an area having a capacitance variation greater than the first reference value in the sensing area SA, and the first area AR1 may correspond to an area having a capacitance variation smaller than the second reference value in the sensing area SA. The third area AR3 may correspond to an area having a capacitance variation smaller than the first reference value and greater than the second reference value in the sensing area SA.

The signal divider SDP may receive the reference value RVV from the extractor EXP and may receive the sensing signal SS from the calculator CAP. The signal divider SDP may divide the sensing signal SS into the first sensing signal SS1 sensed in the first area AR1 and the second sensing signal SS2 sensed in the second area AR2 with reference to the reference value RVV. As an example, the signal divider SDP may define or be the sensing signal SS2 having the capacitance variation greater than the reference value RVV in the sensing signal SS as the second sensing signal SS2. The signal divider SDP may define or be the sensing signal SS1 having the capacitance variation smaller than the reference value RVV in the sensing signal SS as the first sensing signal SS1. The area in which the first sensing signal SS1 is sensed may be the first area AR1, and the area in which the second sensing signal SS2 is sensed may be the second area AR2.

As an example, in the case where the signal divider SDP receives the first reference value and the second reference value from the extractor EXP, the signal divider SDP may divide the sensing signal SS into the first sensing signal SS1 sensed in the first area AR1, the second sensing signal SS2 sensed in the second area AR2, and a third sensing signal sensed in the third area AR3 with reference to the first and second reference values. As an example, the signal divider SDP may define or be the sensing signal SS having the capacitance variation greater than the first reference value in the sensing signal SS as the second sensing signal SS2. The signal divider SDP may define or be the sensing signal SS1 having the capacitance variation smaller than the second reference value in the sensing signal SS as the first sensing signal SS1. The signal divider SDP may define or be the sensing signal having the capacitance variation greater than the second reference value and smaller than the first reference value in the sensing signal SS as the third sensing signal. The area in which the third sensing signal is sensed may be the third area AR3.

The correction value generating portion CGP may include a first parameter calculator PCP1, a second parameter calculator PCP2, and a correction value calculator CCP. As an example, parameters of the surrounding environment may be parameters of temperature or humidity of the surrounding environment. As an example, the correction value CSV may be set or determined according to the temperature of the surrounding environment in a case that the second external input TC2 (refer to FIG. 2) is applied to the display device DD. Hereinafter, the parameters of the surrounding environment will be described as the parameters of the temperature of the surrounding environment. As an example, the parameters of the surrounding environment may include a first parameter PR1.

The first parameter calculator PCP1 may receive the first sensing signal SS1 from the signal divider SDP. The first parameter calculator PCP1 may calculate the first parameter PR1 based on a difference between a first reference sensing signal RSS1 and the first sensing signal SS1. As an example, the first reference sensing signal RSS1 may be a sensing signal sensed in the first area AR1 (refer to FIG. 10B) at a predetermined first temperature. As an example, the first temperature may be a room temperature. As an example, when the temperature of the surrounding environment at which the second external input TC2 is applied to the display device DD is defined as a second temperature, the first sensing signal SS1 may be a sensing signal sensed in the first area AR1 at the second temperature. As an example, the first parameter PR1 may have a value corresponding to a difference between capacitance variations sensed in the first area AR1 at the first temperature and the second temperature, respectively. As an example, the correction value calculator CCP may calculate the correction value CSV based on the first parameter PR1.

As an example, the parameters of the surrounding environment may further include a second parameter PR2.

The second parameter calculator PCP2 may receive the second sensing signal SS2 from the signal divider SDP. The second parameter calculator PCP2 may calculate the second parameter PR2 based on a difference between a predetermined second reference sensing signal RSS2 and the second sensing signal SS2. As an example, the second reference sensing signal RSS2 may be a sensing signal sensed in the second area AR2 (refer to FIG. 10B) at the predetermined first temperature. As an example, the second sensing signal SS2 may be the sensing signal sensed in the second area AR2 at the second temperature. As an example, the second parameter PR2 may have a value corresponding to a difference between the capacitance variations sensed in the second area AR2 at the first temperature and the second temperature, respectively. As an example, the correction value calculator CCP may calculate the correction value CSV based on the first and second parameters PR1 and PR2.

FIG. 11A is a graph showing a frequency of occurrence of the capacitance variations sensed in the sensing area SA in a case that the second external input TC2 is applied to the display device DD at the first temperature. In FIG. 11A, an x-axis represents a level of the capacitance variations, and a y-axis represents a frequency of occurrence of the capacitance variations. Hereinafter, cases where the extractor EXP generates the first reference value and the second reference value will be described with reference to FIGS. 11A and 11B.

A range including the capacitance variations sensed in the first area AR1 at the first temperature may be defined or referred to as a first reference range RSR1. A range including capacitance variations sensed in the second area AR2 at the first temperature may be defined or referred to as a second reference range RSR2. A range including the capacitance variations sensed in the third area AR3 at the first temperature may be defined or referred to as a third reference range RSR3. An average value of the capacitance variations included in the first reference range RSR1 may be defined or referred to as a first reference comparison value RP1. An average value of the capacitance variations included in the second reference range RSR2 may be defined or referred to as a second reference comparison value RP2. As an example, each of the first and second reference comparison values RP1 and RP2 may be a median of the capacitance variations included in the first and second reference sensing signals RSS1 and RSS2 (refer to FIG. 9).

FIG. 11B is a graph showing a frequency of occurrence of the capacitance variations sensed in the sensing area SA in a case that the second external input TC2 is applied to the display device DD at the second temperature. In FIG. 11B, an x-axis represents a level of the capacitance variations, and a y-axis represents the frequency of occurrence of the capacitance variations.

A range including the capacitance variations sensed in the first area AR1 at the second temperature may be defined or referred to as a first range SR1. A range including the capacitance variations sensed in the second area AR2 at the second temperature may be defined or referred to as a second range SR2. A range including the capacitance variations sensed in the third area AR3 at the second temperature may be defined or referred to as a third range SR3. An average value of the capacitance variations included in the first range SR1 may be defined or referred to as a first comparison value SP1. An average value of the capacitance variations included in the second range SR2 may be defined or referred to as a second comparison value SP2. As an example, each of the first and second comparison values SP1 and SP2 may be a median of the capacitance variations included in the first and second sensing signals SS1 and SS2 (refer to FIG. 9).

As an example, in a case where the second temperature is different from the first temperature, a level of the capacitance variation at each position of the sensing area SA at the second temperature may be different from a level of the capacitance variation at each corresponding position of the sensing area SA at the first temperature. As an example, when the second temperature is lower than the first temperature, the level of the capacitance variation at each position of the sensing area SA at the second temperature may be smaller than the level of the capacitance variation at each position of the sensing area SA at the first temperature. As an example, as a difference between the second temperature and the first temperature increases, a difference between the level of the capacitance variation at the second temperature and the level of the capacitance variation at the first temperature at each corresponding position of the sensing area SA may increase.

As an example, a difference between the first reference comparison value RP1 and the first comparison value SP1 may be referred to as a first deviation DV1, and a difference between the second reference comparison value RP2 and the second comparison value SP2 may be referred to as a second deviation DV2. As an example, a difference in the level of capacitance variations according to a variation of temperature may be changed depending on areas. As an example, the difference between the capacitance variation of the second area AR2 at the second temperature and the capacitance variation of the second area AR2 at the first temperature may be greater than the difference between the capacitance variation of the first area AR1 at the second temperature and the capacitance variation of the first area AR1 at the first temperature. As an example, the second deviation DV2 may be greater than the first deviation DV1.

Referring to FIGS. 9 and 11B, as an example, the first parameter calculator PCP1 may calculate the first reference comparison value RP1 based on the first reference sensing signal RSS1. The first parameter calculator PCP1 may calculate the first comparison value SP1 based on the first sensing signal SS1. The first parameter calculator PCP1 may generate the first parameter PR1 based on the first reference comparison value RP1 and the first comparison value SP1. The first parameter PR1 may include the first deviation DV1. As an example, the correction value calculator CCP may calculate the capacitance variation according to the change of temperature in the first area AR1 to which the second external input TC2 is not applied based on the first parameter PR1. Accordingly, the correction value calculator CCP may calculate the correction value CSV based on the difference between the capacitance variations sensed in the input sensing layer ISP (refer to FIG. 6) according to the change of temperature of the surrounding environment.

The second parameter calculator PCP2 may calculate the second reference comparison value RP2 based on the second reference sensing signal RSS2. The second parameter calculator PCP2 may calculate the second comparison value SP2 based on the second sensing signal SS2. The second parameter calculator PCP2 may generate the second parameter PR2 based on the second reference comparison value RP2 and the second comparison value SP2. The second parameter PR2 may include the second deviation DV2. As an example, the correction value calculator CCP may calculate a difference value between the second deviation DV2 and the first deviation DV1 based on the first parameter PR1 and the second parameter PR2. The correction value calculator CCP may calculate the difference in capacitance variation between the second area AR2 to which the second input TC2 is applied and the first area AR1 to which the second input TC2 is not applied according to the surrounding environment based on the difference value between the second deviation DV2 and the first deviation DV1. Accordingly, the correction value calculator CCP may calculate the correction value CSV using the first and second parameters PR1 and PR2 based on the difference between the capacitance variations sensed in the input sensing layer ISP according to the change of temperature of the surrounding environment and the difference in capacitance variation according to the temperature between the area to which the second input TC2 is applied and the area to which the second input TC2 is not applied.

The correcting portion CPP may receive the second sensing signal SS2 from the signal divider SDP and may receive the correction value CSV from the correction value calculator CCP. The correcting portion CPP may convert the second sensing signal SS2 to the correction sensing signal CSS using the correction value CSV. The correction sensing signal CSS may be a sensing signal in which the difference between the capacitance variations according to the change of temperature of the surrounding environment in a case that the second external input TC2 is applied to the display device DD is corrected.

The second measuring portion MSP_b may receive the correction sensing signal CSS from the correcting portion CPP. The second measuring portion MSP_b may calculate the biometric information with respect to the second external input TC2 based on the correction sensing signal CSS and may generate the biometric information signal BS including the calculated biometric information. As the second measuring portion MSP_b generates the biometric information signal BS based on the correction sensing signal CSS, the biometric information of the second external input TC2 may be measured without distortion and without being affected by the surrounding environment.

As an example, the second measuring portion MSP_b may include a first sub-measuring portion MSP_b1 and a second sub-measuring portion MSP_b2.

The first sub-measuring portion MSP_b1 may calculate a representative value RPV of the capacitance variations sensed in the second area AR2 based on the correction sensing signal CSS. As an example, the representative value RPV may be the average value or the median of the capacitance variations.

The second sub-measuring portion MSP_b2 may receive the representative value RPV from the first sub-measuring portion MSP_b1. The second sub-measuring portion MSP_b2 may calculate the biometric information with respect to the second external input TC2 based on the representative value RPV and may generate the biometric information signal BS including the measured biometric information.

Figure 12:
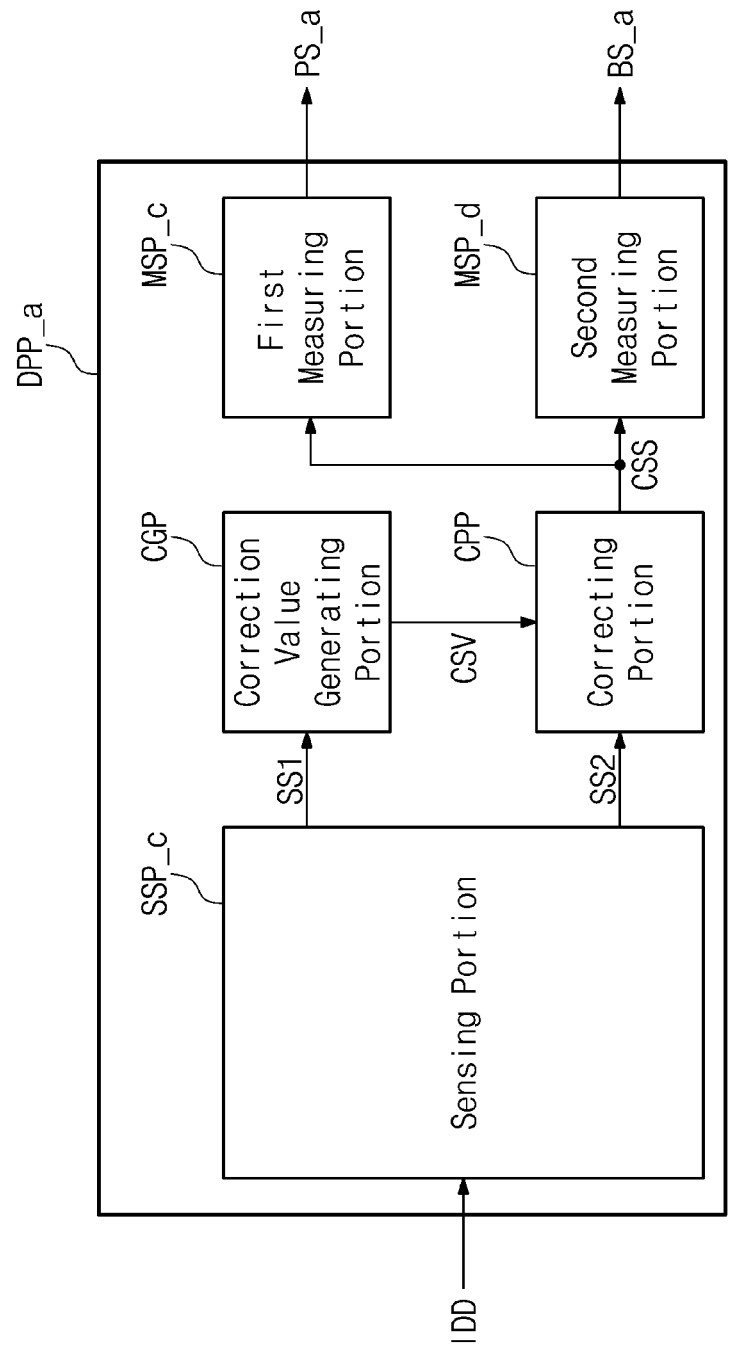
FIG. 12 is a block diagram showing the data processor according to an embodiment.

FIG. 12 is a block diagram showing a data processor according to an embodiment of the disclosure. Hereinafter, in FIG. 12, the same reference numerals denote the same elements and signals as those in FIGS. 8 and 9, and thus, detailed descriptions of the same elements and signals will be omitted.

Referring to FIG. 12, the data processor DPP_a included in the sensing controller SCP (refer to FIG. 7) may include a sensing portion SSP_c, a correction value generating portion CGP, a correcting portion CPP, a first measuring portion MSP_c, and a second measuring portion MSP_d.

As an example, the correcting portion CPP may transmit a correction sensing signal CSS to the first measuring portion MSP_c or the second measuring portion MSP_d. The first measuring portion MSP_c and the second measuring portion MSP_d may generate information about the first external input TC1 (refer to FIG. 2) or the second external input TC2 (refer to FIG. 2) based on the correction sensing signal CSS.

As an example, in a case that the first external input TC1 is applied to the display device DD (refer to FIG. 1), the first measuring portion MSP_c may receive the correction sensing signal CSS from the correcting portion CPP. As the first measuring portion MSP_c generates a position signal PS_a based on the correction sensing signal CSS, the position of the first external input TC1 may be measured without distortion and without being affected by the surrounding environment.

As an example, in a case that the second external input TC2 is applied to the display device DD, the second measuring portion MSP_d may receive the correction sensing signal CSS from the correcting portion CPP. As the second measuring portion MSP_d generates a biometric information signal BS based on the correction sensing signal CSS, the biometric information of the second external input TC2 may be measured without distortion and without being affected by the surrounding environment.

Although the embodiments of the disclosure have been described, it is understood that the disclosure is not limited to these embodiments but various changes and modifications can be made by one ordinary skilled in the art within the spirit and scope of the t disclosure as hereinafter claimed.

Therefore, the disclosed subject matter should not be limited to any single embodiment described herein, and the scope of the present inventive concept shall be determined according to the attached claims.

What is claimed is:

1. A display device comprising:
a display panel displaying an image;
an input sensing layer disposed on the display panel and comprising a plurality of sensing electrodes; and
a sensing controller electrically connected to the input sensing layer and operating in at least one of a first mode and a second mode, wherein
a position of a first external input applied to the input sensing layer is sensed in the first mode,
biometric information of a second external input applied to the input sensing layer is measured in the second mode,
the sensing controller receives an induction signal sensed from the input sensing layer, generates a sensing signal from the induction signal, and converts the sensing signal to a correction sensing signal based on a correction value determined based on parameters of surrounding environment,
the sensing controller measures the biometric information from the correction sensing signal in the second mode, and
the parameters include a parameter of temperature of the surrounding environment.

2. The display device of claim 1, wherein
the input sensing layer comprises a sensing area in which the first external input or the second external input is sensed,
the sensing controller divides the sensing area into a first area in which the second external input is not applied and a second area in which the second external input is applied in the second mode, and
the sensing signal comprises a first sensing signal sensed in the first area and a second sensing signal sensed in the second area.

3. The display device of claim 2, wherein
the correction value is calculated based on the first sensing signal and the second sensing signal, and
the correction sensing signal is obtained by converting the second sensing signal.

4. The display device of claim 1, wherein the sensing controller comprises:
a data converter that receives the induction signal from the input sensing layer and converts the induction signal to induction data; and
a data processor that calculates the sensing signal based on the induction data and measures the biometric information based on the correction sensing signal generated by converting the sensing signal based on the correction value.

5. The display device of claim 4, wherein
the input sensing layer comprises a sensing area in which the first external input or the second external input is sensed,
the sensing area comprises:
a first area in which the second external input is not applied; and
a second area in which the second external input is applied, and the data processor:
generates the sensing signal based on the induction data and divides the sensing signal into a first sensing signal corresponding to the first area and a second sensing signal corresponding to the second area;
receives the first sensing signal and generates the correction value based on the first sensing signal; and
receives the second sensing signal, receives the correction value, and converts the second sensing signal to the correction sensing signal using the correction value.

6. The display device of claim 5, wherein the data processor further:
generates the sensing signal based on the induction data;
receives the sensing signal and extracts a reference value from the sensing signal; and
receives the sensing signal, receives the reference value, and divides the sensing signal into the first sensing signal and the second sensing signal with respect to the reference value.

7. The display device of claim 5, wherein
the parameters comprise a first parameter,
the data processor:
receives the first sensing signal and calculates the first parameter based on a difference between a first reference sensing signal and the first sensing signal; and
the first parameter from the first parameter calculator and calculates the correction value based on the first parameter,
the first reference sensing signal is sensed in the first area at a first temperature, and
the first sensing signal is sensed in the first area when a temperature of the surrounding environment is a second temperature.

8. The display device of claim 7, wherein
the parameters further comprise a second parameter,
the data processor:
receives the second sensing signal and calculates the second parameter based on a difference between a second reference sensing signal and the second sensing signal,
the second reference sensing signal is sensed in the second area at the first temperature,
the second sensing signal is sensed in the second area when the temperature of the surrounding environment is the second temperature, and
the data processor receives the second parameter and calculates the correction value based on the first and second parameters.

9. The display device of claim 5, wherein the data processor further:
receives the correction sensing signal and measures the biometric information based on the correction sensing signal.

10. The display device of claim 1, wherein the plurality of sensing electrodes comprise:
a first electrode; and
a second electrode electrically insulated from the first electrode, and
the sensing signal comprises a value of capacitance variation between the first electrode and the second electrode.

11. The display device of claim 1, wherein the display panel comprises:
a display element layer comprising a light emitting element; and
an encapsulation layer disposed on the display element layer.

12. The display device of claim 11, wherein the input sensing layer is disposed directly on the encapsulation layer.

13. A display device comprising:
a display panel displaying an image;
an input sensing layer disposed on the display panel and comprising a sensing area in which an external input is sensed; and
a sensing controller electrically connected to the input sensing layer, wherein the sensing area comprises:
a first area in which the external input is not applied; and
a second area in which the external input is applied,
the sensing controller receives an induction signal from the input sensing layer, generates a first sensing signal corresponding to the first area and a second sensing signal corresponding to the second area from the induction signal, and generates information of the external input based on a correction sensing signal generated by converting the second sensing signal using a correction value determined based on parameters of surrounding environment, and
the parameters of the surrounding environment parameters include a parameter of temperature of the surrounding environment.

14. The display device of claim 13, wherein the sensing controller calculates the correction value based on a difference between a reference sensing signal and the first sensing signal.

15. The display device of claim 14, wherein the reference sensing signal has a value determined according to the parameters of surrounding environment.

16. The display device of claim 13, wherein the display panel comprises:
a display element layer comprising a light emitting element; and
an encapsulation layer disposed on the display element layer.

17. The display device of claim 13, wherein the parameters of the surrounding environment are selected from a temperature of the surrounding environment.

18. The display device of claim 13, wherein
the input sensing layer comprises a first electrode and a second electrode electrically insulated from the first electrode, and
the first sensing signal and the second sensing signal comprise a value of capacitance variation between the first electrode and the second electrode.

19. The display device of claim 13, the second area is spaced apart from the first area.

* * * * *